United States Patent

[11] 3,590,671

| [72] | Inventor | Marcel Wahli<br>Riedenhaldenstrasse 37, Zurich,<br>Switzerland |
|---|---|---|
| [21] | Appl. No. | 847,549 |
| [22] | Filed | Aug. 5, 1969 |
| [45] | Patented | July 6, 1971 |
| [32] | Priority | Aug. 6, 1969 |
| [33] | | Switzerland |
| [31] | | 11,756/68 |

[54] COUNTERBORE OR BURR REMOVAL TOOL
6 Claims, 9 Drawing Figs.

[52] U.S. Cl. .................................................. 82/1.4,
145/123
[51] Int. Cl. .................................................. B23b 51/10
[50] Field of Search .................................. 77/73, 73.5;
145/123

[56] References Cited
UNITED STATES PATENTS
2,958,241  11/1960  Wahli ........................... 77/73.5

FOREIGN PATENTS
327,817  2/1958  Switzerland .................. 77/73.5

Primary Examiner—Francis S. Husar
Attorney—Werner W. Kleeman

ABSTRACT: A novel counterbore or burr removal tool is disclosed, the tool having a cylindrical head portion and an axially extending shaft connected thereto with at least two knife inserts detachably connected to the facing side of the head portion. The head portion contains a diametrically extending slit which extends into the shaft portion. A screw penetrates the head portion and extends transversely to the axis of the tool for altering the clearance angle of the knives. The facing side of the head portion is provided with ring or annular guide grooves and ribs which engage corresponding ribs and grooves on each knife, the knives being firmly secured to the head portion by means of screws.

INVENTOR
MARCEL WAHLI

ATTORNEY

COUNTERBORE OR BURR REMOVAL TOOL

BACKGROUND OF THE INVENTION

The instant invention generally relates to tools and particularly concerns a counterbore or burr removal tool.

Counterbores in which the actual tool cone is slit along an axial plane for finish or regrinding of the cutting edges disposed diametrically opposite to one another at the surface of the tool cone have long been known in the art. With a tool of this type, the toolhead which bears the tool cone contains a screw which extends transversely to the slit and which points in a radial direction. By means of this screw, both cone halves can be pushed apart and, when the cone halves are in such pushed apart condition, the cone surface can be worked by grinding, for example. In the initial position of the cone halves, the respective portions of the cone surfaces then form clear surfaces for the cutting edges themselves.

In one known counterbore of the type above described, a cylindrical portion is connected to the tool cone with the cylindrical portion being followed by a tapered extension having external threading, the extension, in turn, being screwed into an internal threading of a head portion carried by the tool shaft. The slit formed by both cone halves extends completely through the tool portion screwed into the head portion and further extends as a joint or groove, respectively, into the extension provided with external threading. The screw which penetrates the tool at its cylindrical portion thus not only has the function to push both tool halves apart for the finish grinding or regrinding thereof for which one must compensate for the play of the thread lug in the internal thread of the toolhead, but such screw further has the function to lock both tool halves and/or the thread lug, respectively, in the internal thread of the toolhead.

Dividing the counterbore into a holder comprising shaft and head portions and into a tool portion detachably connected to the holder, affords the advantage that only the tool portion need be made of tool steel whereas the head and shaft portions serving only as a holder for the tool need only be constructed of a material which can be more easily worked and which therefore may also be less expensive. Yet, a counterbore of this type still has various drawbacks.

For one, the distance by which both tool halves or cone halves, respectively, can be pushed apart is relatively slight since a larger elastic deformation as the halves are pushed apart is not possible due to the required relatively large diameter of the cylindrical portion and thus of the correspondingly large cross section of both tool halves. As is known, the elastic deformability of high-speed tool steel is extremely unfavorable. Secondly, an accurate centering of the tool with respect to the tool shaft is practically impossible since such centering must take place by interengaging portions of two threads and further, since a certain play or tolerance of these interengaged thread portions is necessary so as to preserve adjustability of both cone halves. Additionally, with a tool as above described, no absolute possibility exists for adjusting both cone halves to differing clearance angles due to the described support of the tool portion in the toolhead, which clearance angles would, of course, enable adjusting the tool to the material which is to be worked upon. Finally, the cost of production of known counterbores of the type described is relatively high since both tool halves can be manufactured only with attending substantial losses in material and with relatively expensive processing techniques.

SUMMARY OF THE INVENTION

Thus, a need exists for a counterbore or burr removal tool of the above-described type but which eliminates the drawbacks associated with prior art constructions as discussed. It is a primary object of the instant invention to provide a tool which satisfies this need.

This main object, as well as other equally important objects, of the instant invention as will become apparent as the description proceeds, are implemented by the novel counterbore or burr removal tool which comprises a cylindrical head portion and a shaft which is coaxially connected to the head portion, at least two knife inserts detachably connected to the facing side of the head portion and a screw extending transversely to the tool axis for altering the clearance angle of the knives. The novel inventive tool is particularly characterized such that the head portion includes a diametrically extending slit which extends into the shaft portion with the screw actually penetrating the head portion. The facing side of the tool supporting the knives is provided with annular or ring-shaped guide grooves or ribs which engage with a corresponding rib or groove on each knife, the knives being secured to the head portion by means of screws.

By extending the slit between the two tool halves into the shaft portion, it is now possible to utilize the elastic properties of the shaft material for actually displacing the cone surfaces of the tool relative to one another with spring steel preferably being used for both the shaft and head portions. The utilization of the annular grooves or ribs, respectively, for the interengaging parts of the tool and the holder, makes it possible to perfectly center the tool or rather both halves thereof, relative to the shaft. This perfect centering feature further permits the use of replaceable tools, and in particular, with the inventive construction, it is possible to secure an external burr remover having a cone-shaped inner surface to the toolholder instead of a counterbore or internal burr remover, respectively. A particularly advantageous feature of the instant invention relates to the fact that one can construct not only one tool or a pair of tools or knives from a single section of a tool steel bar, but two or even three of such tools can be constructed.

BRIEF DESCRIPTION OF THE DRAWINGS

The invention itself will be better understood and additional features and advantages thereof will become apparent from the following detailed description of preferred inventive embodiments, such description referring to the appended sheets of drawings wherein.

DETAILED DESCRIPTION OF PREFERRED INVENTIVE EMBODIMENTS

Figure 1:
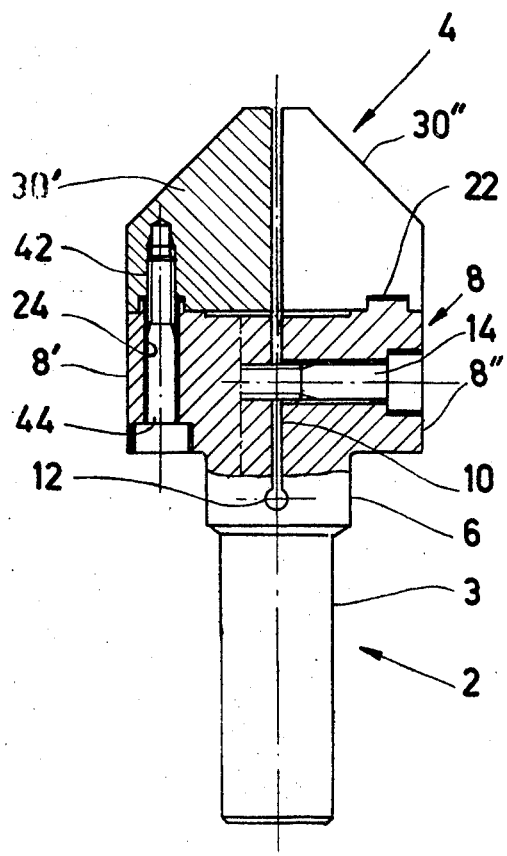
FIG. 1 depicts a first embodiment of a counterbore in cross section taken along the line I-I of FIG. 2.
Figure 3:
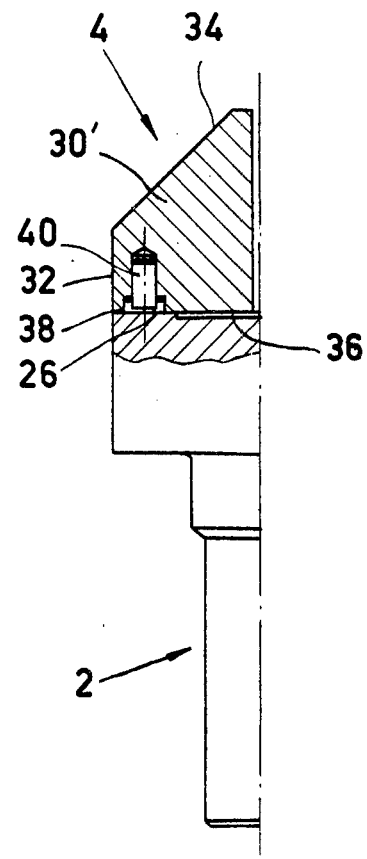
FIG. 3 depicts a sectional view of the counterbore taken along the line III-III of FIG. 2.
Figure 2:
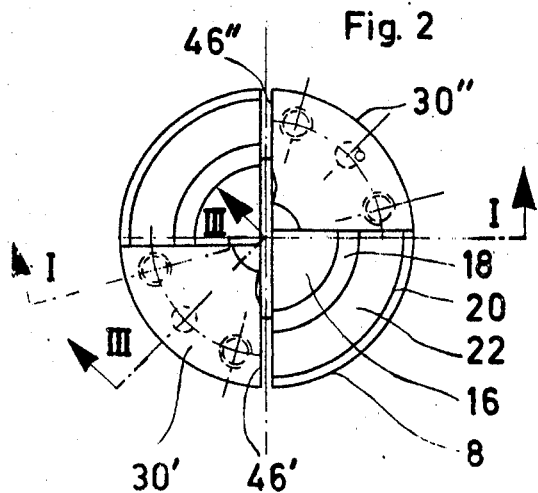
FIG. 2 depicts a plan view of the counterbore according to FIG. 1.

Referring now to FIGS. 1 through 3, a toolholder is generally depicted by reference numeral 2, while a counterbore tool is generally depicted by reference numeral 4. The toolholder 2 includes a cylindrical shaft portion 3 which merges through a suitable intermediate portion 6 into a cylindrical head portion 8 having a diameter enlarged relative to the intermediate portion 6. The head portion 8 includes a diametrically extending slit 10 which also extends into the intermediate portion 6 and ends in a radial bore 12 penetrating the intermediate portion. Head portion 8 is penetrated by a cylindrical capscrew 14 at right angles to the plane of slit 10, the screw 14 acting as a draw screw by means of which both halves 8' and 8" of the head portion can be drawn toward one another. For this reason, the cylindrical head or capscrew 14 is screwed into head portion 8'. Head portion 8, at its facing surface 16, includes two concentrically disposed ring or annular shaped supporting surfaces 18 and 20 between which is disposed a likewise ring or annular shaped and concentrically extending centering rib 22 having a rectangular cross section. As best seen in FIGS. 1 and 2, the head portion further includes four screw holes 24 having parallel axes as well as two pinholes 26 (FIG. 3) which likewise extend parallel to the axis of the tool. One each of the pin holes 26 and two each of the screw holes 24 are disposed in a quarter-circle section of the head 8. Both quarter- circle sections which contain the holes are disposed diametrically opposite one another. Aside from that, the holes or bores 24 and 26 are disposed on a common circular section having a diameter corresponding to half the sum of the outside diameter and inside diameter of the rib 22.

The tool 4 is constructed as a counterbore and consists of two knife segments 30' and 30" extending approximately over one quarter-circle each. The knife segments 30' and 30" are identical to one another. It is customary to construct four knife segments by suitable separating cuts displaced by 90° from a common preworked bar section. Each of the knife segments possesses a cylindrical surface portion 32 and a cone-shaped surface portion 34 with the angle of the cone being 90°, for example. The knife segments include a planar facing surface 36 which is superimposed in juxtaposition upon the ring or annular shaped support surfaces 18 and 20 of the cylindrical head portion 8. The knife segments further include an annular groove 38 into which the ring-shaped rib 22 of head portion 8 engages such that the knife segments are free from play. Each knife segment furthermore comprises a positioning pin 40 which engages with the corresponding pinhole 26 in the head 8. Each knife segment further includes two threaded bores 42 into which engage screws 44 inserted within screw holes 44 of head 8. In this manner, it is possible to perfectly center and position the knife segments 30 and 30' relative to the toolholder and its shaft 3, respectively.

The cutting edges of the tool are formed by edges 46' and 46" on the knife segments which delimit the cone-shaped surface portions 34 on the side thereof which adjoins the slit 10. The two cutting edges can be sharpened by drawing together both segments of the head portions 8' and 8" by means of the screw 14 and subsequently working the cone-shaped surface portions 34 by grinding the same. Bringing both head portions or halves 8' and 8" closer together by tightening the capscrew 14 is achieved by a resilient adjustment taking place primarily throughout the intermediate portion 6. If the capscrew is released, then both halves of the head 8' and 8" would spring back accordingly and both of the cone-shaped surface portions 34 of the knife segments would form clear surfaces behind the respective cutting edges 46' and 46". The resulting clearance angle depends upon the degree of release of screw 14 relative to its tightened position in which the cone-shaped surface portions of the knife segments were ground.

Obviously, by adhering to the tolerances customary in tool manufacture, each of the knife segments 30' and 30" can be replaced without difficulty. Not only is it possible to replace the knife segments by further suitable segments which likewise form counterbores, but also by pairs of segments which would act as external burr removers, for example, one such external burr remover being depicted in FIGS. 4 and 5.

Figure 4:
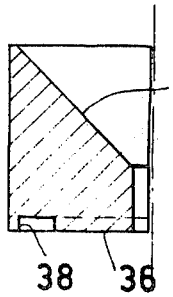
FIG. 4 depicts an axial section taken through an external burr removal segment attachable to the top of the counterbore pursuant to FIG. 1.
Figure 5:
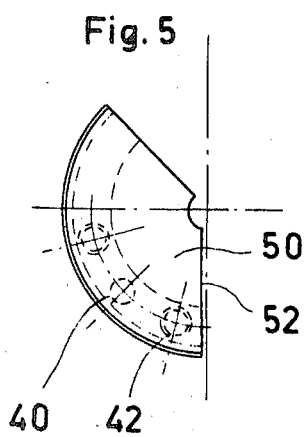
FIG. 5 depicts, in plan view, the tool segment pursuant to FIG. 4.
Figure 9:
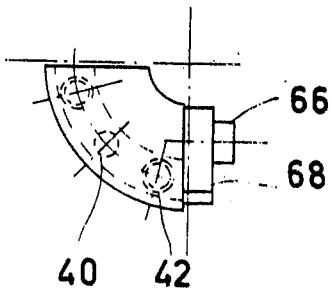
FIG. 9 depicts, in plan view, the segment according to FIG. 6.

Referring now specifically to FIGS. 4 and 5, the external burr removal segment depicted therein extends over an angle of 135°, for example, and is likewise formed from one cylindrical bar section. The segment includes a cone-shaped inner surface 50 as well as a cutting edge 52 delimiting the inner surface 50. The centering, positioning and securing of the segment are accomplished in exactly the same manner as discussed with respect to knife segments 30 and the respective parts of the external burr removal segment similar to those of knife segments 30 are identified by the same reference numerals as used in FIGS. 1 through 3. For finishing grinding or regrinding of the cutting edges and the clear surface 52 and 50, respectively, these are worked on in accordance with a circular cone while the screw 14 is untightened whereupon these surfaces are drawn toward one another for actual use by tightening screw 14 such that surfaces 50 actually form clear surfaces relative to the cutting edges 52.

Figure 7:
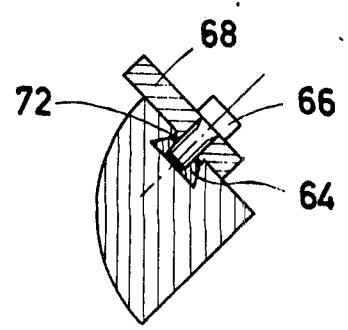
FIG. 7 depicts a sectional view taken along line VII-VII of FIG. 6.
Figure 6:
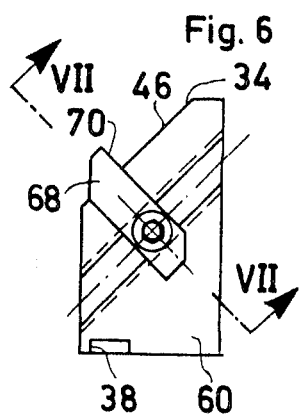
FIG. 6 depicts, in elevational view, a combined internal and external burr removal segment attachable on top of the tool pursuant to FIG. 1.
Figure 8:
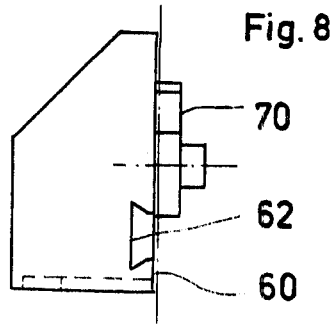
FIG. 8 depicts a side elevational view of the segment according to FIG. 6.

Referring now to FIGS. 6 through 9, a knife segment is depicted therein which differs from that in accordance with FIGS. 1 through 3 only by the features that the separating surface 60 forming the cutting edge 46 together with the cone-shaped surface portion 34 contains a groove 62 having a dovetail shape and which extends parallel to the cutting edge 46. An external burr removal knife 68 is disposed at the separating surface 60 by means of a lock or clamping nut 64 as well as a lock screw 66, the locknut 64 being disposed to be displaceable in the dovetail-shaped groove 62. An external burr removal knife designated 68 is provided with a burr removal cutting edge 70 as best seen in FIG. 8. The burr removal knife 68 is disposed and guided in groove 62 by means of a wedge-shaped extension 72 as seen in FIG. 7 such that the burr removal knife assumes and retains a predetermined angular position relative to the cutting edge 34 as seen in FIG. 6. With the tool depicted in FIGS. 6 through 9, it is possible, for example, to simultaneously remove burrs from pipes both at the internal and external edges thereof merely by setting the external burr removal tool 68 to a certain diameter by displacing the same in the groove 62.

Of course, it is also possible to construct the knife segments to have cone angles other than those depicted or to have such segments extend about other circumferential areas. Additionally, a protective pipe or tube could extend over the knife segments and be secured on the tool shaft, if such is desired for safety reasons. The pipe or tube could be secured, for example, by means of a suitable clamp so as to prevent the workpiece from jumping out during the burr removal operation. As should now be apparent, the objects initially set forth at the outset of the specification, have been successfully achieved. Accordingly, What I claim is:

1. A chamfer tool having a cylindrical head portion and a shaft axially connected thereto, a diametrically extending slit through said head portion also extending into said shaft portion; said head portion having a facing side defining ring-shaped guide grooves, at least two knife inserts detachably connected to said facing side of said head portion, each of said knife inserts including a corresponding guide groove engaging with said guide grooves of said head portion, said knife inserts being secured to said head portion by means of screws, and wherein a screw extends transversely to the axis of the tool through said head portion for altering the clearance angle of said knives.

2. A tool as defined in claim 1, wherein said screw penetrating said head portion is a draw screw.

3. A tool as defined in claim 2, wherein said knife segments are secured to said head portion by means of screws which penetrate said head portion in a direction parallel to the axis of said tool.

4. A tool as defined in claim 3, wherein said head portion includes bores and wherein each of said knife segments includes a positioning pin which engages with a corresponding bore of said head.

5. A tool as defined in claim 1, wherein the facing side of said head portion further includes planar supporting surfaces as well as a ring-shaped centering rib of rectangular cross section.

6. A tool as defined in claim 1, wherein said knife segments contain a guidance groove extending parallel to the cutting edge thereof, and a burr removal knife disposed in said guidance groove such that said burr removal knife can be displaced and locked in position.